(12) United States Patent
Mulholland et al.

(10) Patent No.: US 11,608,423 B2
(45) Date of Patent: Mar. 21, 2023

(54) POLYAMIDE COMPOSITION CONTAINING A METALLIC PIGMENT

(71) Applicant: Ticona LLC, Florence, KY (US)

(72) Inventors: Bruce M. Mulholland, Hebron, KY (US); Coralie Adéle Richard, Elsmere, KY (US)

(73) Assignee: Ticona LLC, Florence, KY (US)

( * ) Notice: Subject to any disclaimer, the term of this patent is extended or adjusted under 35 U.S.C. 154(b) by 686 days.

(21) Appl. No.: 15/411,312

(22) Filed: Jan. 20, 2017

(65) Prior Publication Data

US 2017/0210877 A1 Jul. 27, 2017

Related U.S. Application Data

(60) Provisional application No. 62/281,676, filed on Jan. 21, 2016.

(51) Int. Cl.
| | | |
|---|---|---|
| *C08K 3/08* | (2006.01) | |
| *C08L 91/00* | (2006.01) | |
| *C08J 3/22* | (2006.01) | |
| *C08L 77/02* | (2006.01) | |
| *C08K 5/098* | (2006.01) | |
| *C08K 5/3475* | (2006.01) | |
| *C08L 77/06* | (2006.01) | |

(52) U.S. Cl.
CPC ............. *C08K 3/08* (2013.01); *C08J 3/226* (2013.01); *C08K 5/098* (2013.01); *C08K 5/3475* (2013.01); *C08L 77/02* (2013.01); *C08L 77/06* (2013.01); *C08L 91/00* (2013.01); *C08J 2377/02* (2013.01); *C08J 2377/06* (2013.01); *C08J 2423/06* (2013.01); *C08K 2003/0812* (2013.01); *C08K 2201/005* (2013.01); *C08K 2201/019* (2013.01)

(58) Field of Classification Search
None
See application file for complete search history.

(56) References Cited

U.S. PATENT DOCUMENTS

| | | | |
|---|---|---|---|
| 2,748,099 A | 5/1956 | Bruner et al. | |
| 4,301,050 A | 11/1981 | Masuda et al. | |
| 5,387,647 A | 2/1995 | Eichenauer et al. | |
| 5,530,051 A | 6/1996 | Hirata et al. | |
| 5,804,638 A | 9/1998 | Hayashi et al. | |
| 6,194,507 B1 | 2/2001 | Ali | |
| 6,472,501 B1 | 10/2002 | Fergusson et al. | |
| 6,646,038 B1* | 11/2003 | Ali .......................... | C08K 3/08 |
| | | | 524/441 |
| 6,706,790 B1 | 3/2004 | Berliet | |
| 6,800,127 B2 | 10/2004 | Babler | |
| 6,878,762 B2 | 4/2005 | Urata et al. | |
| 7,009,029 B2 | 3/2006 | Oka et al. | |
| 7,211,615 B2 | 5/2007 | Baumann et al. | |
| 7,902,287 B2 | 3/2011 | Grant et al. | |
| 8,765,861 B2 | 7/2014 | Terada | |
| 8,772,397 B2 | 7/2014 | Gijsman et al. | |
| 8,865,807 B2 | 10/2014 | Lee et al. | |
| 8,946,337 B2 | 2/2015 | Lee et al. | |
| 8,957,142 B2 | 2/2015 | Hong et al. | |
| 8,957,146 B2 | 2/2015 | Shim et al. | |
| 8,969,460 B2 | 3/2015 | Gijsman et al. | |
| 8,975,313 B2 | 3/2015 | Mulholland | |
| 8,975,325 B2 | 3/2015 | Gijsman et al. | |
| 9,177,692 B2 | 11/2015 | Miyamoto et al. | |
| 2003/0004248 A1* | 1/2003 | Wakamura ............... | C08K 3/34 |
| | | | 524/441 |
| 2004/0254280 A1* | 12/2004 | Richter ..................... | C08J 3/226 |
| | | | 524/400 |
| 2011/0170908 A1 | 7/2011 | Saitoh et al. | |
| 2011/0240930 A1 | 10/2011 | Stoeppelmann et al. | |
| 2013/0085214 A1* | 4/2013 | Mulholland .............. | C08K 3/08 |
| | | | 524/91 |
| 2014/0045688 A1 | 2/2014 | Jessop | |
| 2014/0177155 A1 | 6/2014 | Luo et al. | |
| 2014/0187682 A1 | 7/2014 | Mulholland et al. | |
| 2014/0209969 A1 | 7/2014 | Bushelman et al. | |
| 2014/0336317 A1* | 11/2014 | Huang ...................... | C08L 77/00 |
| | | | 524/227 |
| 2015/0225541 A1* | 8/2015 | Oda .......................... | C08K 3/10 |
| | | | 524/607 |
| 2015/0291792 A1 | 10/2015 | Maikisch | |

FOREIGN PATENT DOCUMENTS

| | | |
|---|---|---|
| CA | 2256100 | 1/1999 |
| CA | 2243288 | 4/1999 |
| CN | 101307147 | 11/2008 |
| CN | 102604378 | 7/2012 |
| CN | 103694692 | 4/2014 |
| DE | 102004054390 | 5/2006 |
| EP | 1022313 | 7/2000 |
| JP | H 02117933 | 5/1990 |
| JP | H11279289 | 10/1999 |
| JP | H11293107 | 10/1999 |
| JP | H11315205 | 11/1999 |
| JP | 2000086889 | 3/2000 |
| JP | 2002069220 | 3/2002 |
| JP | 2006-137815 A * | 6/2006 |
| JP | 2006137815 | 6/2006 |
| JP | 2007269890 | 10/2007 |
| JP | 2010270318 | 12/2010 |
| JP | 2013241506 | 12/2013 |
| JP | 2014 043525 | 3/2014 |

(Continued)

OTHER PUBLICATIONS

Translation of JP 2014-133776, Jul. 24, 2014. (Year: 2014).*
International Search Report and Written Opinion PCT/US17/14287, dated April 28, 2017, 8 pages.
Endura Plastics, Inc., Material Selection Guide, 2012, Retrieved from the internet on Apr. 10, 2017, <URL: Http://endura.com/materlal-selection-guide/10>; 31 pages.
European Search Report for EP Application No. 17741993.4 dated Aug. 21, 2019.

*Primary Examiner* — Hui H Chin
(74) *Attorney, Agent, or Firm* — Dority & Manning, P.A.

(57) ABSTRACT

The polymer composition containing a polyamide resin, a metallic pigment, and a carrier is disclosed that exhibits a metallic appearance.

17 Claims, No Drawings

(56) References Cited

FOREIGN PATENT DOCUMENTS

| JP | 2014080574 |   | 5/2014 |
|----|------------|---|--------|
| JP | 2014133776 | * | 7/2014 |
| JP | 2015040302 |   | 3/2015 |
| KR | 20010058458 |  | 7/2001 |

* cited by examiner

POLYAMIDE COMPOSITION CONTAINING A METALLIC PIGMENT

RELATED APPLICATIONS

The present application is based upon and claims priority to U.S. Provisional Patent Application No. 62/281,676, filed on Jan. 21, 2016, which is incorporated herein by reference.

BACKGROUND

Thermoplastic polymers are a class of polymers that soften above a specific temperature and therefore are moldable into all different types of shapes and forms. The polymers solidify upon cooling. Many different types of thermoplastic polymers exist. The polymers can have different properties depending upon their molecular structure.

Thermoplastic polymers are used in numerous and diverse applications. The polymers are generally lighter and less expensive than metals. In fact, those skilled in the art continue to strive to replace parts conventionally made from metal and wood with those made from thermoplastic polymers. In many instances, the polymers offer various advantages with respect to chemical resistance, fatigue resistance, flexural modulus, and/or cost.

One problem that has been encountered in producing molded polymer articles, however, is the ability to produce articles with a distinctive look or appearance. Many thermoplastic polymers, for instance, have a dull appearance when combined with various pigments and dyes. Problems have been experienced in the past in incorporating pigments and dyes into the polymers so that the pigments and dyes uniformly disperse in a manner that allows for the molding of products and parts that have an overall aesthetic appearance.

Various problems, for instance, have been experienced in the past in attempting to incorporate pigments and dyes into polyamide polymers, which are also known as nylon polymers. For instance, the variety of problems that have been experienced include poor incorporation or distribution of the pigment or dye within the polymer, low loading levels that fail to produce a meaningful color effect with uniform properties, and the formation of flow lines, gate blush, or other imperfections in the surface of the polymer when molded.

In view of the above, a need exists for a formulation and process for incorporating pigments and dyes into thermoplastic polymers, such as polyamide polymers. For example, in one embodiment, a need exists for incorporating metallic pigments into polyamide polymers for producing products, parts and articles that have an overall metallic appearance.

SUMMARY

In general, the present disclosure is directed to polymer compositions containing a metallic pigment. The metallic pigment is incorporated into the polymer composition in a manner such that molded products made from the composition can have a metallic appearance. Products made according to the present disclosure can be used in numerous applications. For instance, products made according to the present disclosure may be used as automotive parts (such as automotive interior parts), consumer appliance parts, and the like.

In one embodiment, for instance, the present disclosure is directed to a polymer composition comprising a polyamide resin. The polyamide resin, for example, may be present in the polymer composition in an amount greater than about 60% by weight, such as in an amount greater than about 70% by weight, such as in an amount greater than about 80% by weight, such as in an amount greater than about 90% by weight. In general, the polyamide polymer is present in an amount less than about 99.9% by weight, such as in an amount less than about 99.5% by weight.

In accordance with the present disclosure, the polyamide resin is combined with a metallic pigment, such as an aluminum pigment, and a carrier for the metallic pigment. In one embodiment, the carrier is added in relatively great amounts in relation to the pigment in order to disperse the pigment within the polymer matrix. For instance, the weight ratio between the carrier and the metallic pigment can be from about 1:9 to about 2:1, such as from about 3:17 to about 1:1. In one embodiment, for instance, the weight ratio is from about 1:4 to about 2:3.

The metallic pigment may have any suitable shape. For instance, the pigment may comprise spherical particles. In one embodiment, however, the metallic pigment has a plate-like shape. For instance, the pigment can have an aspect ratio of greater than about 4:1, such as greater than about 8:1. For example, the metallic pigment can have an average median particle size (D50) of from about 2 microns to about 80 microns, such as from about 12 microns to about 60 microns. Particle size can be measured using microscopic examination and/or laser diffraction. The metallic pigment can be present in the polymer composition in an amount from about 0.5% to about 10% by weight, such as in an amount from about 2% to about 8% by weight. The metallic particles may be polished and have a lenticular appearance.

Especially when incorporating a metallic pigment having plate-like particles into the composition, the carrier can comprise a polymer, an oil, or a wax. For instance, the carrier may comprise a polyolefin polymer, such as a polyethylene polymer. Alternatively, the carrier may comprise a hydrocarbon oil, such as a mineral oil. In still another embodiment, the carrier may comprise a wax, such as a montan wax.

Molded articles made according to the present disclosure, in one embodiment, can be produced so as to have a high gloss surface appearance. For instance, articles made according to the present disclosure can have an exterior surface that exhibits a gloss of greater than 40 gloss units when measured at a 60° angle using a glossmeter. For example, the exterior surface of the article may exhibit a gloss of greater than about 50 gloss units, such as greater than about 80 gloss units when measured at a 60° angle.

The polymer composition may further contain various other components depending upon the particular application. In one embodiment, for instance, the polymer composition can contain a lubricant. The lubricant may comprise, for instance, a metal salt of a fatty acid such as zinc stearate.

Other components that may be added to the polymer composition include UV stabilizers, antioxidants, and/or a hindered amine light stabilizer. The above components may be present in the polymer composition in an amount generally less than about 2% by weight, such as in an amount less than about 1% by weight. Each of the above components, for instance, may be present in the composition in an amount greater than about 0.01% by weight, such as in an amount greater than about 0.05% by weight, such as in an amount greater than about 0.1% by weight.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to molded polymeric parts having a metallic finish. The present disclosure is also directed to a polymer composition for producing the parts and to a molding process using the composition. In general, the polymeric parts are formed from a composition containing a thermoplastic polymer, such as a polyamide polymer, a metallic pigment, and/or various other components, such as a carrier and/or a lubricant.

In one embodiment, the metallic pigment is incorporated into the polymer composition in conjunction with a carrier for the pigment. For example, the carrier can improve not only handling of the pigment and dispersion of the pigment into the composition, but has also been found to improve melt processing of the polymer composition. In particular, it was unexpectedly discovered that using a carrier in certain amounts actually improves the ability of the composition to be extruded. The carrier, for instance, may comprise a polymer, a wax, or an oil. In general, the metallic pigment and carrier are combined together so that the carrier is present in an amount of at least 10% by weight, such as in an amount of at least 15% by weight, such as in an amount of at least 20% by weight, such as in an amount of at least 25% by weight, such as in an amount of at least 30% by weight, based upon the total weight of the metallic pigment and carrier together. In general, the carrier is present with the pigment in an amount less than about 60% by weight, such as in an amount less than about 50% by weight, based upon the total weight of the metallic pigment and carrier.

The polymer composition of the present disclosure contains at least one thermoplastic polymer. In one embodiment, the thermoplastic polymer comprises a polyamide polymer either alone or in combination with other thermoplastic polymers. Other thermoplastic polymers that may be present include polyolefins, polyesters, polycarbonates, and the like.

In general, any suitable polyamide polymer may be used in accordance with the present disclosure. Illustrative examples of suitable polyamides include those derived from lactams with 7- to 13-membered rings, such as polycaprolactam, polycaprylyl lactam, and polylauryl lactam, as well as polyamides obtained by a reaction of a polycarboxylic acid, preferably a dicarboxylic acid, with a polyamine, preferably a diamine. Examples of suitable polyacids include, without limitation, alkanedicarboxylic acids having at least about 6 carbon atoms and up to about 12, preferably up to about 10, carbon atoms; and aromatic dicarboxylic acids. Particular examples include adipic, azelaic, sebacic, dodecanedicarboxylic, terephthalic, phthalic, and isophthalic acids and anhydrides and mixtures of these. Suitable polyamines include, without limitation, alkanediamines having at least about 6 carbon atoms and alkanediamines having up to about 12, preferably up to about 8, carbon atoms. Particular examples of useful polyamines are m-xylylenediamine, di-(4-aminophenyl)methane, di-(4-aminocyclohexyl)methane, 2,2-di-(4-aminophenyl)propane, 2,2-di-(4-aminocyclohexyl)propane, and mixtures of these.

Examples of nylons (polyamides) that may be used in the processes and compounds of the disclosure include, without limitation, nylon-6, nylon-6,6, nylon-6,10, nylon-4,6, nylon-6,12, nylon-11, nylon-12, nylon 6/66, partially aromatic nylon copolymers such as nylon-6/6, T, nylon-6,6/6, I/6, T; and so on, and mixtures and blends of these.

In one embodiment, the composition includes nylon-6, which may be produced by the polymerization of caprolactam.

The polyamides that may be used in the present disclosure can have number average molecular weights of at least about 10,000, such as at least about 15,000. The number average molecular weights of the polyamide may be up to about 200,000, such as up to about 100,000, such as up to about 50,000, such as up to about 30,000. It should be understood, however, that any suitable polyamide resin may be used that can have a number average molecular weight outside of the above ranges. The polyamide resins used to prepare the compositions can have a polydispersity of less than about 4, such as less than about 2.5 in one embodiment.

The polyamide polymer is generally present in the polymer composition in an amount greater than about 60% by weight, such as in an amount greater than about 70% by weight, such as in an amount greater than about 80% by weight, such as in an amount greater than about 85% by weight, such as in an amount greater than about 90% by weight, such as in an amount greater than about 91% by weight. The polyamide polymer is generally present in the composition in an amount less than about 99.9% by weight, such as in an amount less than about 99.5% by weight.

The composition may further optionally include a lubricant. Examples of such lubricants include fatty acids esters, the salts thereof, esters, fatty acid amides, organic phosphate esters, and hydrocarbon waxes including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes.

When employed, the lubricant(s) typically constitute from about 0.001% by weight to about 2% by weight, and in some embodiments, from about 0.005% by weight to about 0.1% by weight of the thermoplastic composition. In one embodiment, the lubricant may comprise a metal stearate, such as zinc stearate. The zinc stearate may be present in an amount from about 0.01% to about 0.05% by weight. It was found that even small amounts of a metal stearate can significantly improve the processing properties of the composition. Further, in the past, polyamide polymers were typically combined with copper compounds, such as copper iodide, as a lubricant. Copper compounds, however, can adversely interfere with the metallic pigment and/or the polyamide polymer during processing and can ultimately discolor the resulting products. Thus, in one embodiment, the polymer composition of the present disclosure contains no copper compounds, such as copper iodide.

In accordance with the present disclosure, the thermoplastic polymer, such as the polyamide polymer, is combined with a metallic pigment. In general, any suitable metallic pigment may be used in accordance with the present disclosure. For instance, the metallic pigment may have any suitable shape. The metallic pigment particles may be spherical and can have an aspect ratio of less than about 4:1, such as from about 1:1 to about 4:1.

In one particular embodiment of the present disclosure, however, metallic pigment particles are used that have a plate-like shape. Plate-shaped particles have been found to provide various advantages and benefits. The plate-like particles, for instance, can produce articles having a more metallic appearance, especially if the plate-like particles are uniformly dispersed within the polymer matrix.

In one embodiment, the particles can be polished or otherwise have a high reflectivity and can be lenticular or have a flake shape (silver dollar or cornflake shape). In one embodiment, the plate-like particles can have an aspect ratio of greater than about 4:1, such as greater than about 8:1, such as from about 10:1 to about 300:1. The plate-like particles can have a median diameter of generally greater than about 12 microns, such as greater than about 14 microns. The plate-like particles can have a median diameter of generally less than about 100 microns, such as less than about 70 microns, such as less than about 60 microns. In one embodiment, the particle size of the metallic pigments ranges from about 15 microns to about 55 microns.

In one embodiment, the metallic pigment may comprise an aluminum pigment that contains elemental aluminum. The aluminum pigment, for instance, can be very thin having a thickness of less than about 1 micron and can have a median diameter as described above. The aluminum pigment can have a pronounced flop, a high brilliance and be highly reflective.

In one embodiment, the aluminum pigment can contain greater than about 80% by weight aluminum. The aluminum pigment can be present alone or in combination with other additives, such as a carrier. In fact, in one embodiment, the metallic pigment is combined with a carrier and the resulting blend is incorporated into the polymer composition. The carrier can not only facilitate dispersing the metallic pigment into the polymer matrix, but can also improve the melt processing characteristics of the polymer composition.

In one embodiment, for instance, the metallic pigment is combined with a carrier prior to being combined with the thermoplastic polymer, such as the polyamide polymer. The carrier can be present in relatively great amounts in relation to metallic pigment. For instance, the weight ratio between the carrier and the metallic pigment can be greater than about 1:9, such as greater than about 3:17, such as greater than about 1:4. The weight ratio is generally less than about 2:1, such as less than about 1:1, such as less than about 2:3. In one particular embodiment, the weight ratio between the carrier and the metallic pigment is from about 1:4 to about 3:10. The carrier in the above amounts is particularly well suited for incorporating a metallic pigment that has a plate-like shape into the polymer composition.

Various different carriers may be used in conjunction with the metallic pigment. In one embodiment, for instance, the carrier may comprise a polymer, such as a polyolefin polymer. The polyolefin polymer, for instance, can have a relatively low molecular weight and may comprise a polypropylene polymer, a polyethylene polymer, or the like. The polyolefin polymer may comprise a homopolymer or a copolymer. In one embodiment, the carrier comprises a polyethylene wax.

In an alternative embodiment, the carrier may comprise any suitable wax, such as a montan wax. In yet another embodiment, the carrier may comprise a hydrocarbon oil, such as a mineral oil. For instance, the hydrocarbon oil may be comprised primarily of alkanes having a carbon chain length greater than about 9 carbon atoms.

The amount of metallic pigment incorporated into the polymer composition can vary depending upon the particular application. In general, the metallic pigment is present in an amount greater than about 0.5% by weight, such as in an amount greater than about 1% by weight, such as in an amount greater than about 2% by weight. The metallic pigment is generally present in an amount less than about 12% by weight, such as in an amount less than about 10% by weight, such as in an amount less than about 8% by weight. In one particular embodiment, the metallic pigment is present in an amount from about 2% to about 8% by weight, such as from about 2% to about 6% by weight. For example, in one embodiment, the metallic pigment is present in the polymer composition in an amount from about 2% to about 4% by weight. When higher gloss characteristics are needed, however, the metallic pigment may be present in an amount from about 4% to about 6% by weight.

Of particular advantage, the present inventors discovered that first producing a masterbatch containing the metallic pigment and polyamide polymer is generally not necessary when incorporating the metallic pigment into the polyamide polymer. For instance, it is generally not necessary to first produce a polyamide composition containing a highly concentrated metallic pigment which is then later combined with further amounts of a polyamide polymer.

In addition to a polyamide polymer resin, a metallic pigment, a carrier, and optionally a lubricant, the polymer composition can also contain various other additives and components. The various other additives and components may be present in the composition in an amount up to about 5% by weight, such as in an amount from about 0.001% to about 2% by weight. In one embodiment, for instance, each additional additive or component is present in an amount less than about 1% by weight.

In one embodiment, for instance, the polymer composition may additionally contain an ultraviolet light stabilizer. As used herein, an ultraviolet light stabilizer comprises a material that absorbs ultraviolet light. In particular, the ultraviolet light stabilizer absorbs ultraviolet light in order to prevent the ultraviolet light from discoloring or otherwise adversely interfering with the polymer.

In one embodiment, the ultraviolet light stabilizer comprises a benzophenone, a benzotriazole, or a benzoate. Particular examples of ultraviolet light stabilizers include 2,4-dihydroxy benzophenone, 2-hydroxy-4-methoxybenzophenone, 2-(2'-hydroxy-3',5'-di-t-butylphenyl)benzotriazole, 2-(2'-hydroxy-3'-t-butyl-5'-methylphenyl)-5-chlorobenzotriazole, 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2'-hydroxyphenyl)benzotriazoles, e.g. 2-(2'-hydroxy-5'-methylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl)benzotriazole, and 2,2'-methylene bis(4-t-octyl-6-benzotriazolyl)phenol, phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g. 2-ethyl-2'-ethoxyoxanilide and 2-ethoxy-4'-dodecyloxanilide; cyanoacrylates, e.g. ethyl-α-cyano-β,β-diphenylacrylate and methyl-2-cyano-3-methyl-3-(p-methoxyphenyl)acrylate, or mixtures thereof.

Still another additive that may be present in the composition is a sterically hindered phenol compound, which may serve as an antioxidant. Examples of such compounds, which are available commercially, are pentaerythrityl tetrakis[3-(3,5-di-tert-butyl-4-hydroxyphenyl)propionate] (Irganox 1010, BASF), triethylene glycol bis[3-(3-tert-butyl- 4-hydroxy-5-methylphenyl)propionate] (Irganox 245, BASF), 3,3'-bis[3-(3,5-di-tert-butyl-4-hydroxyphenyl)propionohydrazide] (Irganox MD 1024, BASF), hexamethylene glycol bis[3-(3,5-di-tert-butyl-4-hydroxyphenyl)propionate] (Irganox 259, BASF), and 3,5-di-tert-butyl-4-hydroxytoluene (Lowinox BHT, Chemtura). Preference is given to Irganox 1010 and especially Irganox 245. The above compounds may be present in the composition in an amount less than about 2% by weight, such as in an amount from about 0.01% to about 1% by weight.

Light stabilizers that may be present in addition to the ultraviolet light stabilizer in the composition include sterically hindered amines. Hindered amine light stabilizers that may be used include oligomeric compounds that are N-methylated. Examples of light stabilizers include 2,2,6, 6-tetramethyl-4-piperidyl compounds, e.g., bis(2,2,6,6-tetramethyl-4-piperidyl) sebacate (Tinuvin 770, BASF) or the polymer of dimethyl succinate, 1-(2-hydroxyethyl)-4-hydroxy-2,2,6,6-tetramethyl-4-piperidine (Tinuvin 622, BASF), Bis(1,2,2,6,6-pentamethyl-4-piperidinyl)-[[3,5-bis (1,1-dimethylethyl)-4-hydroxyphenyl]methyl]butylmalonate (Tinuvin PA 144), or 3,9-bis(2-hydroxy-1,1-dimethylethyl)-2,4,8,10-tetraoxaspiro[5,5]undecane (Adeka Stab LA 63P). The light stabilizers, when present, can be included in amounts greater than about 0.1% by weight, such as in amounts greater than about 0.5% by weight, but in an amount less than about 2% by weight, such as in an amount less than about 1% by weight.

Fillers that may be included in the composition include glass beads, wollastonite, loam, mica, molybdenum disulfide or graphite, inorganic or organic fibers such as glass fibers, carbon fibers or aramid fibers. The glass fibers, for instance, may have a length of greater than about 3 mm, such as from 5 to about 50 mm. Many of the above fillers can be present in the polymer composition in an amount less than about 2% by weight. In other embodiments, however, a filler may be present in an amount greater than 2% by weight, especially when the composition contains reinforcing fibers. For example, in one embodiment, fillers can be present in the composition in an amount from about 2% to about 15% by weight, such as from about 5% to about 10% by weight.

In addition to the metallic pigment, the polymer composition may also contain a coloring agent. The coloring agent may comprise any suitable pigment or dye. The pigment may comprise an inorganic pigment or an organic pigment. Pigments that may be present in the composition include, for instance, titanium dioxide, ultramarine blue, cobalt blue, phthalocyanines, anthraquinones, mixtures thereof, and the like. Other coloring agents can include carbon black or various other polymer-soluble dyes. The coloring agents can be present alone or in combination in an amount up to about 2% by weight, such as in an amount from about 0.01% to about 1% by weight.

The polymer composition of the present disclosure can be used to produce various molded parts. The parts can be formed through any suitable molding process, such as an injection molding process or through a blow molding process. Polymer articles that may be made in accordance with the present disclosure include knobs, door handles, automotive panels, interior automotive parts such as bezels, consumer appliance parts, and the like without limitation.

As described above, the polymer composition of the present disclosure produces molded parts having a metallic appearance. For example, parts made according to the present disclosure can have high gloss characteristics if desired. Gloss is the characteristic or attribute of an exterior surface that causes the surface to have a shiny, lustrous and/or metallic appearance. Gloss is generally dependent upon the manner in which light is reflected off of a surface. A high gloss surface generally reflects incident light primarily at the same angle at which the light is incident upon the surface. Surfaces with less gloss, for instance, have a tendency to scatter light in all directions as the light reflects off the surface.

Gloss can be measured by reflecting light off of a surface at a particular angle and then measuring reflection using a glossmeter. More particularly, gloss is measured by shining a known amount of light at a surface and quantifying the reflectance. A glossmeter directs a light at a specific angle to a test surface and simultaneously measures the amount of reflection.

Surfaces made in accordance with the present disclosure exhibit high metallic brilliance. In particular, the molded parts may exhibit a gloss of greater than about 40 gloss units when measured at a 60° angle using a glossmeter. More particularly, molded parts in accordance with the present disclosure may exhibit a gloss of greater than about 50 gloss units, such as greater than about 80 gloss units, such as greater than about 90 gloss units, when measured at a 60° angle. In general, the surfaces exhibit a gloss of less than about 150 gloss units, such as less than about 136 gloss units, at a 60° angle. Gloss can be measured at a 60° angle according to ASTM Test D-523-08.

In addition to having excellent gloss characteristics, molded articles made according to the present disclosure can also have excellent color properties. Color can be quantified by measuring the absorbence with an optical reader in accordance with a standard test methodology known as "CIELAB", which is described in Pocket Guide to Digital Printing by F. Cost, Delmar Publishers, Albany, N.Y. ISBN 0-8273-7592-1 at pages 144 and 145 and "Photoelectric color difference meter", Journal of Optical Society of America, volume 48, page numbers 985-995, S. Hunter, (1958), both of which are incorporated herein by reference in their entirety. More specifically, the CIELAB test method defines three "Hunter" scale values, $L^*$, $a^*$, and $b^*$, which correspond to three characteristics of a perceived color based on the opponent theory of color perception and are defined as follows:

$L^*$=Lightness (or luminosity), ranging from 0 to 100, where 0=dark and 100=light;
$a^*$=Red/green axis, ranging from −100 to 100; positive values are reddish and negative values are greenish; and
$b^*$=Yellow/blue axis, ranging from −100 to 100; positive values are yellowish and negative values are bluish.

In accordance with the present disclosure, for instance, molded articles containing a metallic pigment can have an $L^*$ value that is greater than the $L^*$ value of the polyamide polymer not containing the metallic pigment.

In general, the $L^*$ value can be greater than about 70, such as greater than about 74, such as greater than about 76, such as greater than about 78, such as greater than about 80, such as even greater than about 82. The $L^*$ color value is generally less than about 95, such as less than about 90.

The present disclosure may be better understood with reference to the following example.

Example

Various polyamide polymer compositions were formulated containing an aluminum pigment and a carrier. The resulting compositions were tested for gloss and color values. The polyamide polymer used was a polycaprolactam polymer.

The polyamide polymer was combined with various different blends of an aluminum pigment and a carrier. In particular, the following aluminum pigment and carrier blends were tested at different weight percentages.

| Sample No. | wt. % Al pigment and particle size | wt. % carrier |
|---|---|---|
| 1 | 80% 28 micron | 20% PE wax |
| 2 | 70% 40 micron | 30% PE wax |
| 3 | 80% 15 micron | 20% montan wax |
| 4 | 70% 24 micron | 30% PE wax |
| 5 | 80% 55 micron | 20% mineral oil |
| 6 | 80% 34 micron | 20% PP wax |

The following results were obtained:

|  |  | L* | a* | b* | Gloss @ 60° |
|---|---|---|---|---|---|
| Polyamide resin |  | 78.39 | −1.88 | −0.35 | 96.0 |
| Sample No. 1 | 0.5% | 68.19 | −0.52 | −0.44 | 96.5 |
|  | 1% | 71.17 | −0.57 | −0.93 | 99.0 |
|  | 2% | 73.50 | −0.58 | −1.26 | 99.3 |
|  | 4% | 74.63 | −0.6 | −1.50 | 99.9 |
|  | 8% | 74.86 | −0.6 | −1.57 | 95.3 |
| Sample No. 2 | 0.5% | 65.86 | −0.79 | −1.30 | 95.1 |
|  | 1% | 66.50 | −0.52 | −0.22 | 95.5 |
|  | 2% | 68.23 | −0.47 | −0.05 | 95.3 |
|  | 4% | 70.27 | −0.44 | −0.17 | 90.8 |
|  | 8% | 72.21 | −0.44 | −0.47 | 90.2 |
| Sample No. 3 | 0.5% | 74.82 | −0.51 | −0.29 | 105 |
|  | 1% | 77.69 | −0.55 | −0.78 | 107 |
|  | 2% | 79.98 | −0.56 | −1.13 | 112 |
|  | 4% | 81.91 | −0.57 | −1.30 | 110 |
|  | 8% | 83.69 | −0.55 | −1.38 | 105 |
| Sample No. 4 | 0.5% | 69.33 | −0.39 | −0.31 | 99.9 |
|  | 1% | 72.17 | −0.44 | −0.06 | 100 |
|  | 2% | 74.61 | −0.45 | −0.39 | 102 |
|  | 4% | 77.83 | −0.47 | −0.67 | 100 |
|  | 8% | 79.27 | −0.46 | −0.86 | 93.7 |
| Sample No. 5 | 0.5% | 65.07 | −0.34 | −0.47 | 97.6 |
|  | 1% | 65.35 | −0.32 | −0.13 | 97.4 |
|  | 2% | 66.99 | −0.39 | −0.45 | 96.0 |
|  | 4% | 69.91 | −0.43 | −0.82 | 90.4 |
|  | 8% | 71.40 | −0.45 | −1.02 | 87.2 |
| Sample No. 6 | 0.5% | 68.24 | −0.47 | −0.51 | 98.8 |
|  | 1% | 79.87 | −0.54 | −0.34 | 98.4 |
|  | 2% | 72.98 | −0.54 | −0.72 | 98.6 |
|  | 4% | 75.44 | −0.56 | −1.03 | 96.1 |
|  | 8% | 76.29 | −0.56 | −1.24 | 91.8 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. The polymer composition for producing molded products having a metallized appearance, the polymer composition being formed by the following process:
combining a polyamide polymer with a carrier and a metallic pigment blend, the carrier being present in the blend such that the weight ratio between the carrier and the metallic pigment is from about 1:9 to about 2:3, the carrier comprising a polyolefin homopolymer, a polyolefin copolymer, a montan wax, or a hydrocarbon oil, the metallic pigment being in the form of plate-like particles, the particles having a median particle size of from about 2 microns to about 100 microns and an aspect ratio of greater than about 4:1, the metallic pigment having a thickness of less than 1 micron, the metallic pigment being present in the composition in an amount of from about 0.5% to about 12% by weight;
the polyamide polymer present in the composition in an amount of at least about 70% by weight; and
wherein the polymer composition is free of fillers and reinforcing fibers.

2. The polymer composition as defined in claim 1, wherein the carrier comprises a polyolefin polymer, and wherein the weight ratio between the carrier and the metallic pigment is from about 3:17 to about 2:3.

3. The polymer composition as defined in claim 1, wherein the carrier comprises the hydrocarbon oil.

4. The polymer composition as defined in claim 1, wherein the carrier comprises a polyethylene wax.

5. The polymer composition as defined in claim 1, wherein the composition is free of copper compounds.

6. The polymer composition as defined in claim 1, wherein the metallic pigment comprises an aluminum pigment.

7. The polymer composition as defined in claim 1, further containing a lubricant.

8. The polymer composition as defined in claim 7, wherein the lubricant comprises a metal stearate.

9. The polymer composition as defined in claim 1, wherein the thermoplastic polymer resin comprises nylon-6 or nylon-6,6.

10. The polymer composition as defined in claim 1, wherein the polymer composition further contains an antioxidant, a hindered amine light stabilizer, and an ultraviolet light stabilizer.

11. The polymer composition as defined in claim 1, wherein the metallic pigment particles have an aspect ratio of greater than about 8:1.

12. The polymer composition as defined in claim 1, wherein the metallic pigment is present in the polymer composition in an amount from about 2% to about 6% by weight.

13. The polymer composition as defined in claim 1, wherein the metallic pigment particles have a median particle size (D50) of from about 12 microns to about 60 microns.

14. The polymer composition as defined in claim 1, wherein the carrier comprises a mineral oil.

15. The polymer composition as defined in claim 1, wherein the polymer composition, when tested for gloss, produces a gloss greater than about 90 gloss units when measured at a 60° angle according to ASTM Test D-523-08.

16. The polymer composition as defined in claim 1, wherein the carrier is the montan wax.

17. The polymer composition for producing molded products having a metallized appearance, the polymer composition being formed by the following process:
combining a polyamide polymer with a carrier and a metallic pigment blend, the carrier being present in the blend such that the weight ratio between the carrier and the metallic pigment is from about 1:9 to about 2:3, the carrier comprising a polyolefin homopolymer, a polyolefin copolymer, a montan wax, or a hydrocarbon oil, the metal pigment comprising an aluminum pigment, the metallic pigment having a thickness of less than 1 micron, the metallic pigment being present in the composition in an amount of from about 0.5% to about 12% by weight;

the polyamide polymer present in the composition in an amount of at least about 70% by weight; and wherein the polymer composition is free of fillers and reinforcing fibers.

* * * * *